Patented Oct. 4, 1949

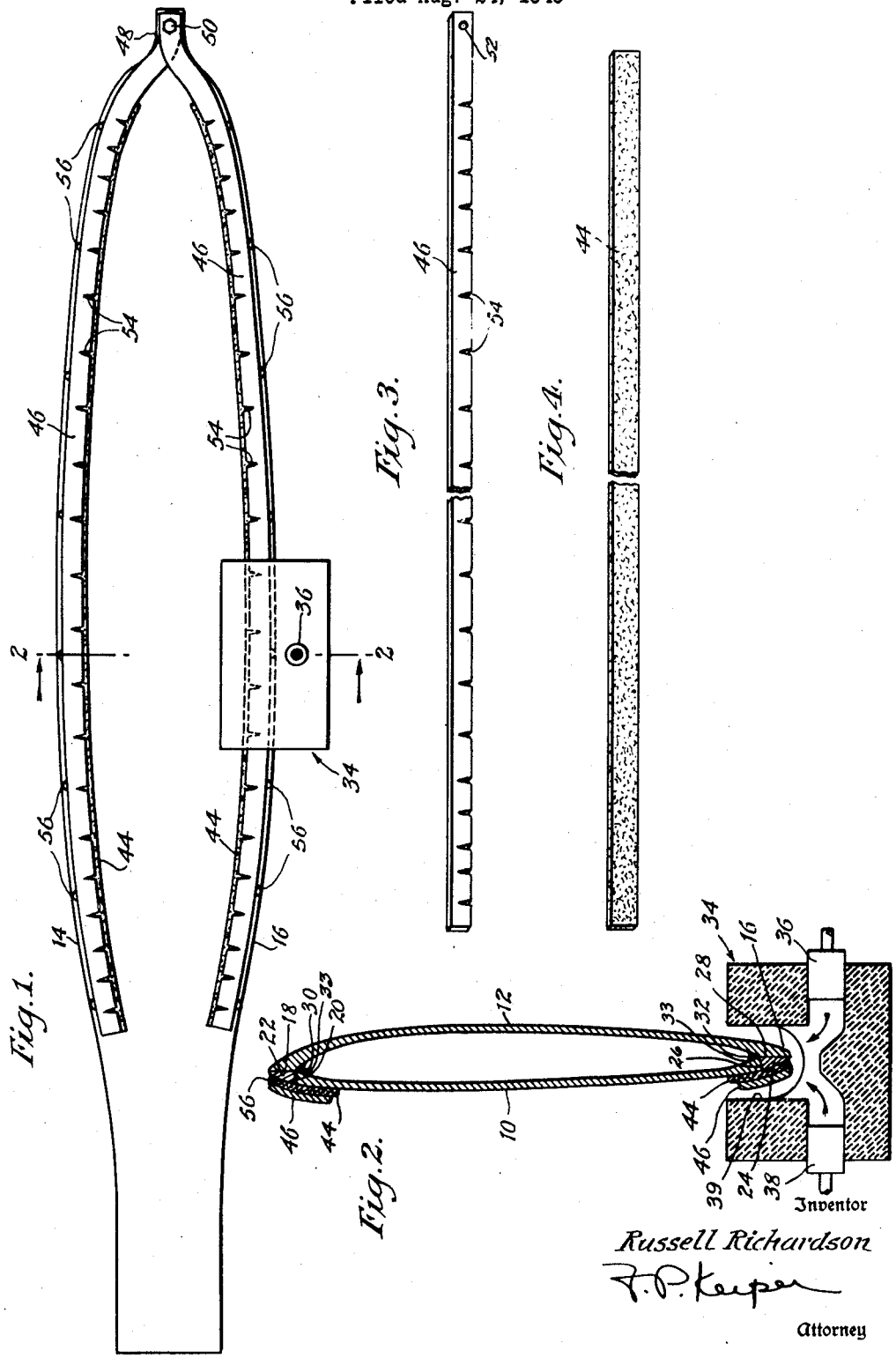

2,483,934

UNITED STATES PATENT OFFICE 2,483,934

METHOD OF BRAZING PROPELLER BLADES

Russell Richardson, Mountain Lakes, N. J., assignor to Curtiss-Wright Corporation, a corporation of Delaware Application August 24, 1945, Serial No. 612,435

1 Claim. (Cl. 113—112)

This invention relates to the application by brazing of fillets in crevices formed by the juncture of steel plates secured together by welding, and more particularly to the heating of such plates to the brazing temperature without stressing the weld to a degree resulting in fracture.

In the manufacture of hollow propeller blades, by way of example, from plates forming the thrust and camber surfaces, and in which the plates are secured together by welding at a juncture extending adjacent to and along the leading and trailing edges, a sharp internal angle is created, having a somewhat uneven or irregular inside surface. The sharp angle formed by the plates at juncture as well as such irregularities as are present due to welding produces stress concentration points. To eliminate the stress concentration points, it has been proposed to fuse or flow copper or copper alloy in the valley formed by the juncture, the adjacent plates being heated so that the copper or copper alloy may form a fillet and at the same time flow into and smoothen out the irregularities and unevenness and become brazed to the adjacent metal, so as to thus relieve the juncture from the dangerous stress concentrations which would otherwise be present.

Where such brazing has been employed, it is necessary to heat the adjacent members to a brazing temperature in the neighborhood of 2100 degrees F. The application of such a temperature to the welded joint, between the plates adjacent the angle requiring the fillet creates stresses which, when superimposed upon such stresses as may already exist from the welding, despite stress relief, has been found to result in fracture at the welded joint.

It is, therefore, an object of the present invention to prevent in such structures the occurrence of fractures as a result of the heating incident to the application of a brazed fillet.

Another object of the invention is to provide a means for heating welded members to a brazing temperature while protecting the actual weld from extreme temperatures likely to ultimately result in fracture.

A further object of the invention is to provide a method for heating welded members to a brazing temperature to apply a fillet therebetween adjacent the weld without subjecting the weld to dangerous temperature extremes.

The above and other novel features of the invention will appear more fully hereinafter from the following detailed description when taken in conjunction with the accompanying drawings. It is expressly understood, however, that the drawings are employed for purposes of illustration only and are not designed as a definition of the limits of the invention reference being had for this purpose to the appended claim.

In the drawings wherein similar reference characters refer to similar parts throughout the several views:

Figure 1 is a side elevational view of a propeller blade having heat protectors thereon;

Fig. 2 is a transverse section taken on the line 2-2 of Fig. 1 showing the blade positioned within a furnace;

Fig. 3 is a perspective view of a retaining member; and

Fig. 4 is a perspective view of a gasket retained by the member.

Referring to the drawings and more particularly to Figs. 1 and 2, there will be seen a propeller blade composed of a pair of steel plates in the form of a thrust plate 10 and camber plate 12. The plates are welded along the leading edge 14 and the trailing edge 16, by the deposit of weld metal in V notches formed between the edge of one plate and the inside edge surface of the other. As shown in Fig. 2, for example, the inside edge surface 18 of the camber plate and the edge 20 of the thrust plate form a V groove into which weld metal 22 is deposited to assist in forming the leading edge and secure the thrust and camber plates together.

Similarly the trailing edge 16 is formed by weld metal 24 deposited in a V groove formed by the edge 26 of the thrust plate 10 and the inside edge surface 28 of the camber plate 12. The process of depositing the weld metal 22 and 24, whether by electric or gas welding results in stresses which are subsequently at least in part relieved, but in spite of the best welding technique available, such joints are likely to have irregularities and crevices, particularly on the inside surfaces within the blade where inspection is difficult. Additionally, the acute inside angle formed at 30 and 32 by the plates, aside from the possibility of such irregularites presents a dangerous stress concentration point.

It has accordingly been found desirable to provide rounded fillets 33 of copper or copper alloy within the acute angles formed between the plates, at 32 and 30, the fillets extending along the length of the leading and trailing edges of the blade. To cause copper or copper alloy or other filleting material to flow in the sharp angles 30 and 32 or valleys, and form a rounded fillet and at the same time flow into any irregularities or crevices by capillary action, it is essential to heat the metal of the blade adjacent to the joint while applying or brazing the filleting metal. To accomplish this purpose the edge of the blade is passed through a heating furnace 34, having opposed burners 36 and 38 and refractory walls 39, the burner preferably operating on hydrogen gas in excess to maintain an oxygen-free hydrogen atmosphere. The furnace may be formed from a chrome brick. Such a burner may be of a length sufficient to heat a section of the blade edge at a time, and the blade may be slowly moved through the furnace, to progressively heat the blade edge along its length while melting copper wire, copper dust or paste positioned within the blade in the valleys to be filleted.

In order to prevent the heating of the blade from introducing heat expansion stresses in the welded joint which because of the stresses likely present from the welding, may be of a character sufficient to cause fracture, it has been found desirable to blanket the weld, and the metal immediately adjacent thereto, so that the hydrogen flame impinges directly upon only the virgin metal of the plates 10 and 12. By thus blanketing the weld and contiguous metal, heat stresses such as may be set up are caused to localize in the virgin metal at a distance from the weld, so that heat stress fractures in the weld or metal adjacent thereto are eliminated.

To blanket the heat satisfactorily from the weld an asbestos pad 44 in the form of a strip several inches wide and approximately a sixteenth of an inch thick is laid over the weld and the surface adjacent thereto. The strip is secured in place by a steel strip 46 somewhat narrower than the blanket, which in the case of a propeller blade is bent to conform to the shape of the leading or trailing edge to which it is to be applied. The strip may be secured in place at one end when applied to a propeller blade having an end apertured conveyor lug 48 by a bolt 50 passing through the lug aperture, and a hole 52 in the steel strip. The strip may be secured at the other end and at spaced points along its length by tack welding as at 56 or clamping or by any suitable means. The strip is notched as at 54 at frequent intervals to render the same flexible and also to prevent heat stresses from traveling along the strip, and thereby cause severe warpage.

In practice, with respect to propeller blades, the blade is provided with the blanket of asbestos 44, in the form of a gasket, and the steel strips 46 then applied to hold the asbestos in place. Copper in the form of one or more wires is then inserted through the open shank into the blade and allowed to lie within the valley formed by the juncture of the two plates. To accommodate a larger fillet where the plates 10 and 12 are thicker as at the shank end the wire may be double for a short distance adjacent the shank. If a fine fillet is desired at the tip end, the wire may be reduced in cross section by joining a section of smaller wire at the end. The blade edge is then slowly passed through the furnace and progressively heated to about 2200 degrees F., to melt the copper and cause the same to readily flow into the irregularities and at the same time form a round fillet. Thereafter, the strip 46 and asbestos gasket 44 are removed and the blade subjected to further finishing operations.

It will thus be seen that the actual welded seam between the plates is protected from direct flame impingement, and the heat applied to the virgin metal spaced from the weld. Thus such stresses as are set up are greatest in the virgin metal subjected to the direct heating effect of the furnace.

While the invention has been described particularly as applying to propeller blades, it will appear that the procedure may be employed in conjunction with any welded joint wherein filleting is required.

Though this invention has been illustrated with respect to a single application, it is to be understood that the invention is not limited thereto, but may be exercised in various equivalent ways. As many variations may be effected without departing from the spirit of the invention, as will be apparent to those skilled in the art, reference will be had to the appended claim for a definition of the limits of the invention.

What is claimed as new and desired to be secured by Letters Patent, is:

The method of brazing a fillet in the acutely angled space between two overlapping plate members joined adjacent their edges by deposited fused weld metal, one of said members being thinner than the other, in which the weld metal forms a bead whose surface is substantially contiguous with the outer surfaces of said plates in which the joint between the thinner plate and the weld metal is smaller than the joint between the larger plate and the weld metal and in which the acutely angled space between the plates is bordered predominantly by the inner surfaces of said plates, which comprises placing a heat resistant blanket over a portion of the thinner plate and over the outer surface of said weld bead adjacent thereto placing a metal strip over said blanket and tack-welding the strip to the plate to secure the blanket, holding the welded plates with the blanket so that the apex of the interior acute angle is downward, applying brazing material in said acutely angled space, and exteriorly heating said blanket and the plates adjacent the weld simultaneously to greater-than-brazing temperature so that the weld bead and apex of the acutely angled space is heated to brazing temperature predominantly by heat conduction through said plates and blanket for fusion of the brazing material and so that a fillet of brazing material is formed in the apex of the acutely angled space, said blanket acting as a retarder to prevent the thinner plate and the weld bead from exceeding the level of temperature to which the adjacent thicker plate is raised.

RUSSELL RICHARDSON.

REFERENCES CITED

The following references are of record in the file of this patent:

UNITED STATES PATENTS

| Number | Name | Date |
|---|---|---|
| 2,226,243 | Herz | Dec. 24, 1940 |
| 2,280,337 | McKee | Apr. 21, 1942 |
| 2,295,777 | Dennen et al. | Sept. 15, 1942 |
| 2,341,784 | John | Feb. 15, 1944 |

OTHER REFERENCES

Practical Manual of Autogenous Welding by Granjon and Rosenberg, 8th ed., p. 118, last paragraph. Pub. by Charles Griffin and Co., Ltd. London, England.

Welding Encyclopedia, 10th ed. 1941, Pub. by Welding Engineer Pub. Co., Chicago, Ill. pp. 58–59. (Copy in Div. 14.)